United States Patent
Boehm et al.

(10) Patent No.: US 8,382,163 B2
(45) Date of Patent: Feb. 26, 2013

(54) SECURITY PAPER (75) Inventors: Michael Boehm, Kirschheim-Heim-stetten (DE); Reinhard Plaschka, Windach (DE); Friedrich Kretschmar, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 1623 days.

(21) Appl. No.: 10/490,893

(22) PCT Filed: Sep. 26, 2002

(86) PCT No.: PCT/EP02/10815
§ 371 (c)(1),
(2), (4) Date: Jul. 26, 2004

(87) PCT Pub. No.: WO03/029003
PCT Pub. Date: Apr. 10, 2003

(65) Prior Publication Data
US 2004/0239097 A1    Dec. 2, 2004

(30) Foreign Application Priority Data
Sep. 28, 2001   (DE) .................... 101 48 122

(51) Int. Cl.
*D04H 1/00*   (2006.01)
*B42D 15/00*   (2006.01)
(52) U.S. Cl. ............ 283/57; 428/292.1; 283/58; 283/59
(58) Field of Classification Search .......... 162/102, 162/103, 110, 108, 109, 116, 140; 428/690, 428/292.1; 283/57
See application file for complete search history.

(56) References Cited

U.S. PATENT DOCUMENTS

| 61,321 | A | | 1/1867 | Crane | |
|---|---|---|---|---|---|
| 946,014 | A | | 7/1910 | Gernaert | |
| 2,296,596 | A | * | 9/1942 | Brown | 40/760 |
| 2,782,541 | A | * | 2/1957 | Spertus | 40/799 |
| 4,313,984 | A | | 2/1982 | Moraw et al. | |
| 4,462,866 | A | * | 7/1984 | Tooth et al. | 162/103 |
| 4,749,087 | A | * | 6/1988 | Buttifant | 209/534 |
| 4,897,300 | A | * | 1/1990 | Boehm | 428/195.1 |
| 5,449,200 | A | * | 9/1995 | Andric et al. | 283/67 |
| 6,491,324 | B1 | * | 12/2002 | Schmitz et al. | 283/82 |
| 6,530,527 | B1 | * | 3/2003 | Ahlers et al. | 235/491 |
| 6,808,792 | B1 | * | 10/2004 | Weber | 428/202 |

FOREIGN PATENT DOCUMENTS

| DE | 199 07 697 A1 | | 8/2000 |
|---|---|---|---|
| EP | 0 453 131 A2 | | 10/1991 |
| EP | 0 667 248 A1 | | 8/1995 |
| GB | 796477 A | | 6/1958 |
| GB | 2 260 772 A | | 4/1993 |
| GB | 2260772 | * | 4/1993 |
| GB | 2260772 A | | 4/1993 |

OTHER PUBLICATIONS

Google search: Historical Archive: Canada and the United States Revolutionary War Maps on CD.*
75 Uses for Scotch Tape Brand Transparent Tape, Vicky Lansky, 1995-2002.*

* cited by examiner

*Primary Examiner* — Jennifer Chriss
*Assistant Examiner* — Camie Thompson
(74) *Attorney, Agent, or Firm* — Rothwell, Figg, Ernst & Manbeck, P.C.

(57) ABSTRACT

The invention relates to documents of value, such as bank notes, checks, passports, ID cards or the like, with increased fitness for circulation, to a security paper for producing them, and to a method for producing said security paper and such documents of value.

26 Claims, 6 Drawing Sheets

SECURITY PAPER

CROSS-REFERENCE TO RELATED APPLICATION

This application is a §371 of PCT Application Serial No. PCT/EP02/10815, filed Sep. 26, 2002.

BACKGROUND OF THE INVENTION

1. Field of the Invention

This invention relates to documents of value, such as bank notes, checks, passports, ID cards or the like with increased fitness for circulation, to a security paper for producing them, and to a method for producing said security paper and such documents of value.

2. Description of the Background Art

Bank notes are usually made of so-called security papers consisting of cotton fibers and having special security features, such as intaglio printed motifs, hologram patches and watermarks. A bank note's period of circulation depends on the stress. Certain denominations are preferably used in trade and thus have a smaller period of circulation due to the stronger load through environmental influences. Environmental influences are for example attack by different chemical substances, such as perspiration, fat, oil, lyes, acids, etc. Particularly smaller note values are subject to increased wear. The main cause of the restricted period of circulation for bank notes is considered to be (besides premature soiling) initial tear of the bank note in the edge area.

U.S. Pat. No. 3,661,700 describes a coated, reinforced paper produced by coating a support comprising a net of a longitudinally oriented polypropylene film with a mixture of cellulose-containing fibers and/or other fibers and mineral and/or organic pigments or fillers, and binders. Since the net is used for reinforcement, it must have the same dimensions as the paper to be reinforced therewith.

British patent no. 3453 describes a paper for bank notes, papers of value and the like containing a fine, open-mesh fabric with or without figures, patterns or numbers. The open-mesh fabric is incorporated into the paper by being passed into the paper stock while the stock is being moved over a screen on its way from the tank to the press rolls, before it reaches the press rolls so that the fabric can be pressed into the flowable paper stock. In this case, too, the fabric has the same dimensions as the paper.

British print 1 219 643 relates to the production of reinforced paper whereby a netlike or meshed reinforcement material is incorporated by different methods. The reinforcement material has the same dimensions as the paper.

AU-PS 488,652, for example, has proposed making bank notes completely from a plastic substrate. Said plastic substrates do have higher initial tear resistance than paper substrates but the plastic substrate's tear propagation resistance is extremely low in comparison with a paper substrate. Further, with a plastic bank note there can be no use of customary and proved security elements such as portrait watermark and windowed security thread. Also, the steel gravure printing customary in the bank note field, which serves as an additional tactile authenticity mark due to the relief arising from the inking, leads only to a flat, hardly perceptible relief on plastic substrates.

The above-described prior art security papers moreover share the disadvantage that the incorporation of an all-over net or the use of a plastic substrate causes the special properties, such as sound and feel, of bank note paper to be completely lost.

SUMMARY OF THE INVENTION

The problem of the invention is therefore to produce a document of value that has increased initial tear resistance and therefore guarantees a high period of circulation, and that remains unchanged in its other typical properties, such as printability, sound, color, etc.

In addition, the problem of the invention is to provide a security paper from which the inventive documents of value can be produced, and to provide methods for producing the inventive security papers and documents of value.

SUMMARY OF THE INVENTION

According to the invention, the document of value is provided at least in an edge area at least partly with a reinforcement that prevents initial tear of the document of value, or at least distinctly delays it compared to prior art documents of value.

The term "edge area" refers here not only to the one-dimensionally extended edge itself of the document of value, but also to the two-dimensionally extended margin area adjoining the edges. The exact dimensions are to be determined by the expert in the individual case. The reinforced edge area preferably extends parallel to the edges of the document of value.

The kind of security paper from which the documents of value are made is not bound to any conditions, so that customary security papers made of fibers from annuals, in particular cotton fibers, can be used, as well as security papers consisting at least partly of polymer fibers, preferably polyamide fibers.

The reinforcement can extend only on part of at least one edge area, but also over the total length of at least one edge area. Preferably, an edge area is provided with the reinforcement over its total length. Especially preferably, the opposite edge areas, in particular those in the longitudinal direction of the document of value, are reinforced or, if the production method allows, all edge areas of the document of value are reinforced. The extension of the reinforcement longitudinally and transversely to the document of value is to be dimensioned so as to guarantee optimal protection of the edges, on the one hand, but largely retain the special properties of the document of value, on the other hand.

The local position of the reinforcement with respect to the edges to be protected on the document of value can be realized in different ways. Firstly, it is possible that the reinforcement incorporated in or applied to the paper is flush with the paper edge. On the other hand, the reinforcement can also be slightly set in from the reinforced edge area, i.e. the reinforcement is not flush with the edge of the document of value but the paper protrudes beyond the reinforcement. The dimension of the paper portion protruding beyond the reinforcement depends on, among other things, the intended use of the paper, the kind of paper and/or the degree of stress. In any case, the tolerable width of the protruding paper portion at which the inventive purpose is preserved can be determined by the expert. Besides the possibility of setting in the reinforcement, the reinforcement can also protrude beyond the edge area to be reinforced on the security paper. In this case, the reinforced edges of the document of value do not consist of paper but of another material.

The flush, set in and projecting variants of the reinforcement can each be embedded into the paper, i.e. incorporated at least partly into the volume of the document of value, or applied to the paper. With the variants applied to the paper, it is still possible to apply the reinforcement to only one, i.e. the front or back, side of the security paper, or to provide the reinforcement on the front and back. If a reinforcement is provided on the front and back, it can be of identical material, or of course be designed differently according to the possibilities below.

Depending on the intended use, the abovementioned possibilities of positioning the reinforcement locally within the document of value can also be combined with each other. For example, a reinforcement set in from the paper edge and embedded parallel to a first long side of the security element can be combined with a reinforcement projecting over the second long side and applied to the paper. Additionally, the two short sides of a rectangular document of value could be protected with a flush reinforcement incorporated into the paper or applied to the paper. In a preferred embodiment, the reinforcements extend parallel to the longitudinal edge of the document of value since they can be provided on the security paper by a continuous method. Other variants that are optionally effected on the finally cut paper are likewise possible, but more elaborate to produce.

The manner of reinforcement can be realized in a great number of ways. For clarity's sake the individual variants will be divided up according to whether the reinforcement is applied to the paper or embedded into the paper. A further division results according to whether the reinforcement is processed on the front and/or back, set in, flush or projecting and whether there is the possibility of realizing the reinforcement on one, several, all sides or only on opposite sides.

The principle of initial tear resistance is fundamentally the same for all variants described below. The edges endangered e.g. by abutment, bending or active initial tear on documents of value, in particular bank notes, are protected from excessive mechanical stress by a reinforcement. Reinforcements that are flush with the document edges or even protrude beyond them are especially effective since they completely shield endangered edges from mechanical attacks. However, the variant with the reinforcement set in from the document edge also offers sufficient protection. If someone attempts to damage a thus equipped bank note, the set in reinforcement offers distinct resistance to further tear so that the edge area cannot be destroyed. According to the invention the initial tear resistance can also be limited to the areas where bank notes are exposed to particular loads, for example in the area of the bend creases.

Variant A) Lacquer-Reinforced Edge Area

The term "lacquer" refers according to the invention to any liquid, pasty or viscous substance suitable as a printing ink, coating composition or impregnating material. It can be applied by basically any printing or paper coating method or any method for partly applying or transferring the substance to a substrate such as paper.

With the lacquer-based reinforcement, the lacquer is applied to or incorporated into the security paper, e.g. by printing or coating methods. Depending on the adjustment of the lacquer properties and the type of application method, the paper is either coated with lacquer superficially in the areas to be reinforced, or actually impregnated with lacquer so that the reinforcement is not only present on the surface but also incorporated into the volume of the paper.

The lacquer reinforcement can be processed so that the reinforcement is flush with the paper edge to be reinforced or else accordingly set in.

Preferably, the dimensions of the reinforced paper area run parallel to the edges of the document of value, i.e. the paper has a band- or strip-shaped reinforcement. It is also possible to form the reinforced area in a wedge or trapezoidal shape.

It is possible to process only one side, i.e. the front or back, of the paper or of course both sides of the paper.

In regard to the edge areas to be reinforced, all possibilities are available. For example, only part of an edge area can be reinforced, or else the edge area over the total paper length. Likewise, several edge areas can be reinforced regardless of their position relative to each other. However, the reinforced edge areas are preferably located opposite and relate to the long sides of the security paper, so that the greatest possible edge length and the most stressed edges are protected in the finished document of value. The lacquer reinforcement preferably has a width of from about 1 to 20 millimeters, especially preferably from 2 to 10 millimeters, in particular preferably of 5 millimeters.

The lacquers used can be water or solvent-based, one or multicomponent systems. Suitable lacquers are based on natural and synthetic binders, styrene butadiene latex, acrylic latex, rubber-containing coating compounds, emulsion polymers, two-component polyurethanes, dispersions, etc. The lacquer is preferably a curable resin composition which is for example chemically or radiation curing, preferably UV curing.

The lacquer wets the fibers in the surface area of the paper and forms a complete surface film over the fiber. This maximizes cohesion between the individual fibers while at the same time minimizing access of dirt to the fiber as a positive side-effect.

If the lacquer is to penetrate into the paper, this can be optimized in a great variety of ways.

For example, a laser or corona treatment can obtain a selective opening of the paper surface so that the applied lacquer penetrates more easily into the paper. The laser or corona treatment can be controlled so as to adjust any intermediate stage from slight roughening of the paper surface to perforation of the paper.

Further, a watermark can be incorporated into the paper in the area of the reinforcement. In the area of the watermark the paper has thinner and thicker places. If the paper is lacquered in this area the lacquer can penetrate into the paper more easily in the area of the thin places. The thus reinforced area is actually plasticized in the process. Lacquering can be done on one or both sides. Depending on the nature of the lacquer and the paper and the desired reinforcement effect, one-sided lacquering might suffice, since at very thin places in the paper in the watermark area the lacquer can penetrate optimally or even come through on the other side. Penetration of lacquer is particularly facilitated in the area of a so-called highlight watermark. This is a watermark having especially light areas when viewed in transmitted light, i.e. especially thin paper areas. Lacquering can be done only in the area of the watermark, but of course also on the total paper surface, the actual reinforcement effect according to the invention being strongest in the area of the watermark.

In the document of value, for example bank note, the watermark can extend over the whole area of the document or be located along all edges or only on selected edges or sections of edges. It can be either set in from the edge or flush with the edge.

The lacquer is knife-coated or printed onto the security paper after its production, i.e. onto the paper web or paper sheet. Printing of the lacquer is preferably done by screen printing or the flexographic process. This can be done directly subsequent to papermaking in the paper machine or in a separate operation, for example directly before or after cutting and/or printing of the security paper.

Then the inventive security paper is printed and possibly further processed in accordance with the paper of value to be produced. The lacquer must be applied to the security paper, and the thus treated security paper cut, such that the lacquer reinforcement is positioned at the desired places in the document of value to be produced.

If a document of value with reinforcements flush with the longitudinal edges is desired, the lacquer is thus applied to the security paper in parallel strips, the strips being accordingly wide and spaced apart. Cutting of the security paper is then done e.g. along the center lines of the lacquer strips and at right angles thereto.

If a document of value is to be produced whose reinforcements are set in from its edges, parallel extending lacquer strips must likewise be applied to the paper, the lacquer strips being spaced apart alternately widely and narrowly. The wider spacing specifies the width of the document of value, the narrower spacing the width of the paper strip protruding over the reinforcement. Cutting is done along the center line extending between the narrowly spaced strips and at right angles thereto.

According to a preferred embodiment, the lacquer additionally contains in low concentration at least one additive with a visually and/or machine detectable physical property. The additive can have for example magnetic, electroconductive, luminescent, diffractive, light-polarizing or light-interfering properties. For example, it can comprise interference layer or liquid crystal pigments or other special-effect pigments, such as lustrous metallic effect coloring pigments, etc., or luminescent substances that are excitable with UV light and emit in the visible spectral region. In the case of a machine check, however, luminescent substances emitting in the invisible spectral region, preferably in the IR spectral region, can also be used. Photochromic or thermochromic additives are likewise conceivable.

The additive can be present uniformly distributed throughout the coating or be applied in the form of patterns. For producing the patterns, a composition in the form of a certain pattern is printed on in a first step, said composition containing in small quantities in the manner of a doping (less than 1 wt %) at least one additive with at least one visually and/or machine detectable physical property. The remaining part of the surface of the paper is provided only in a second step, in register to the first pattern, with the same composition but not containing the detectable additive.

Instead of physically detectable substances, however, chemically reacting additives can also be used. For example, a component of a color reaction system can be added to the lacquer. When the second component of the color reaction system is applied at a later time, a colored area, pattern, writing or the like becomes visible on the security paper. This can serve as an authenticity feature or also as a cancellation mark for a check, ticket or the like.

The use of a plurality of additives and/or variation of the concentration of one or more additives permits any desired codings, for example in the form of a bar code, to be produced very simply on the security paper. Said coding can for example constitute an independent additional security feature, or serve as a reference feature for other data already provided on the security paper.

According to the inventive principle, a plurality of different codings can of course also be produced. For example, the lacquers containing the particular additive are applied simultaneously or successively to the paper in the form of the desired codings. Alternatively, the different codings can be disposed on different surfaces of the security paper. Double-sided coating with the same additive is of course likewise possible.

In an especially preferred embodiment, the lacquer is transparent or adapted to the color of the security paper so that the reinforced area cannot, or hardly, be perceived with the naked eye.

Variant B) Foil-Reinforced Edge Area

With the foil material based reinforcement, the foil material is at least partly applied to the paper or embedded into the paper.

The foil material can be processed so that the reinforcement is flush with the paper edge to be reinforced or is accordingly set in. In this embodiment there is also the possibility that the foil material protrudes over the edge to be reinforced on the paper.

In the variant with foil material applied to the paper, the front and/or back of the paper can be equipped with foil material.

In regard to the edge areas to be reinforced, there are different possibilities depending on the production method. If the reinforcements are laminated to the paper, part of an edge area can be reinforced, for example, or else the edge area over the total paper length. A plurality of edge areas can likewise be reinforced regardless of their position relative to each other. However, the reinforced edge areas are preferably located opposite and relate to the long sides of the document of value, so that the greatest possible edge length and most stressed edges are protected in the finished document of value.

If the foil reinforcements are embedded into the paper, this is done during papermaking. The security paper is usually made on a cylinder paper machine, to which foil material is supplied in the area of the stock feed so that foil material is incorporated into the sheet during sheet formation. The production method can be controlled so that foil material is embedded completely into the paper, designed as a windowed thread or incorporated in the form of a strip separating the individual paper strips. To guarantee improved cohesion between paper and foil material, the foil material can additionally be adhesive-coated. When the finished paper web is cut, cutting can be controlled so that the foil material is flush with the paper edge, set in or projects over the paper edge in the finished document of value. If band-shaped foil material, e.g. strip-shaped material, is incorporated, the foil material normally travels parallel with the fiber direction of the paper. Consequently, one or at most two edge areas, namely the parallel edge areas, will have the foil reinforcement depending on cut in the long grain or the short grain. To achieve reinforcements embedded into the paper in all edge areas in the finished paper of value, e.g. bank note, grid-shaped reinforcements will preferably be embedded into the security paper. Grid-shaped reinforcements refer to flat shaped articles that are comparable with a large-meshed grid, the mesh width of said grid corresponding e.g. approximately to the size of the paper of value. The grid itself is constructed for example of strip-shaped foil material, the individual strips extending parallel and perpendicular to each other.

Preferably, the dimensions of the reinforced paper area run parallel to the edges of the security paper, i.e. the paper has a band- or strip-shaped reinforcement.

Foil material according to the invention refers to any suitable material that increases the initial tear resistance of the document of value in the edge area. The term "foil material" is not intended to mean any limitation to plastic materials, although these are preferably used. Rather, this term is intended to indicate that the foil material should be a relatively thin material so that the appearance of the security paper or document of value and its properties, in particular in regard to its processibility, are not negatively affected. However, the use of thicker material is not excluded in general.

The foil material is preferably tear-resistant material, preferably foil made of plastic, metal or a plastic-metal laminate. Depending on the manner of use, the foil material is designed to be transparent or adapted to the color of the security paper or document of value so that. the foil material is as inconspicuous as possible or, as far as possible, practically imperceptible with the naked eye. For special uses, in particular in embodiments where the reinforcement is visible on the surface of the security paper, the foil material is optionally equipped with further security features, such as holograms, Kinegrams® or other diffraction structures, or printing inks containing interference layer or liquid crystal pigments or other special-effect pigments, such as lustrous metallic effect coloring pigments, etc. Additionally, the transitions from foil material to paper can be overprinted with a printed pattern, in particular by intaglio printing. Additionally or alternatively, the foil material can be equipped with the additives described under variant A).

If a pure plastic thread is involved the foil material used is preferably polyester; as a metal foil aluminum-coated plastic foil is preferred.

In a further variant, the foil reinforcements consist of one or more layers transferred by the transfer method. Preferably, these are reinforcements with embossed holograms consisting substantially of an embossed plastic layer, a metal layer and an adhesive layer.

The foil material can likewise involve netlike structures. Said netlike structures can consist of natural, polymer and/or glass fibers, the fibers preferably being welded together, glued, interwoven or plaited. If desired, the structures can be accordingly colored. This can be done by printing, spraying or vapor-deposition, in particular in a vacuum, preferably using suitable masks. The polymer fibers can be produced with a diameter of a few microns. A fiber diameter between about 1 micron and about 40 microns is preferred.

For equipping with additional security features and additives, the possibilities described under variant A) and those described for the above-described foil material apply to the same degree.

Variant C) Special Fiber Reinforced Edge Area

A further possibility of reinforcing edge areas of documents of value is to incorporate special fibers in the endangered areas during papermaking.

i) Firstly, these are fibers having increased tear strength in comparison with the fibers used for the basic substrate, without any further treatment of the fibers being necessary before or after incorporation into the paper pulp. This does not exclude additional pre- or aftertreatment, however. These special fibers are in particular synthetic fibers, or synthetic fibers incorporated into the paper web as endless threads, or fibers of especially long form with a length of several millimeters that are incorporated into the paper pulp. It is of course also possible to use synthetic fibers of endless form and mixtures of endless synthetic fibers with fibers of long form.

The fiber reinforcement can be incorporated into the security paper so that the reinforcement is flush with the paper edge to be reinforced, set in, or projects accordingly in the finished document of value.

Preferably, the dimensions of the reinforced paper area run parallel to the edges of the security paper, i.e. the paper has a band- or strip-shaped reinforcement. The spatial arrangement of the reinforcement and the cut of the security paper are effected according to a similar principle as the designs described under variant A).

The special fibers can be supplied to the paper pulp e.g. in the area of the headbox via a separate inlet. On the one hand, the inflow of special fibers can be regulated so that the paper pulp containing the original "normal" fibers is enriched with the special fibers in the area of the inflow; on the other hand, the special fibers can replace the "normal" fibers by 100% in the area of the inflow.

ii) Secondly, the special fibers are fibers that are preprocessed by beating such that a dense, strong sheet with increased initial tear resistance is formed in the area where said fibers are used, during the actual papermaking. For this purpose, wet beating can be performed so that the fibers are crushed and defibrillated. This causes hydration of the fiber and enlargement of the specific surface. The contact surfaces of the fibers within the sheet increase considerably so that hydrogen bridges can form that cause the strength of the fiber structure. Alternatively, chemical beating of the fibers can be effected, i.e. additives are used that act as a lubricant during beating, increase the contact area between fibers and produce intimate contact between fibers and fibrils on the molecular scale. The choice of beating, of the degree of beating and of the duration of beating and the specific conditions for increasing the strength of the fibrous composite are to be adapted to the particular fibers used, and determined by the expert.

The thus pretreated fibers can be incorporated into the security paper locally and technically like the special fibers under i). The special fibers can consist of the same kind of fiber as used for the basic substrate or be different therefrom. If cotton fibers are used, for example, the total document of value can consist of cotton fibers but in the area of the reinforcement there are cotton fibers that have been subjected to special beating.

iii) Further, the special fibers are fibers that are subjected to aftertreatment after being incorporated into the paper during its production, and acquire increased tear strength through said aftertreatment. The fibers can be e.g. thermoplastic fibers that are fused together by the action of heat. However, any other chemical or physical process can be used that causes crosslinking, fusion, welding, gluing, etc., of the fibers used. For example, the desired reinforcement can be achieved by gluing, the action of solvents or the triggering of chemical crosslinking reactions.

The fibers requiring aftertreatment can be incorporated into the security paper locally and technically like the special fibers under i). Besides the possibility of incorporating the fibers into the paper only in the area of the reinforcement, the security paper can be equipped with said special fibers over the whole area, the aftertreatment being done only locally in the margin areas to be reinforced. Whole-area treatment has the great disadvantage over such locally limited treatment that the paper to be processed is exposed to external influences, such as heat treatment by a heated roller, in its whole surface and thus strongly impaired over the whole area. In contrast, only the margin area is treated according to the invention, thereby guaranteeing effective initial tear resistance while saving energy, chemicals, time and thus costs. If, for example, a paper web is present with special fibers incorporated in a strip shape, which can be crosslinked thermally, the required thermal energy can be transferred to the paper easily likewise in a strip shape using an accordingly narrow heated roller, a laser, an infrared source, etc., after papermaking The special fibers under i) to iii) can additionally be equipped with the additives described under variant A), it being possible to incorporate a coding into the edge area of the document of value by a combination of additives. For example, a separate feed of differently equipped fibers to the paper pulp could produce two strips located side by side and running parallel in an edge area. If the fibers are fibers with e.g. different luminescent properties, a kind of simple bar code can be generated in this way. It is also possible to supplement the coding via different width of the strips. The special fibers under i) to iii) can moreover be used not only singly but also in any conceivable combination or mixture.

Variant D) Further Components to Promote Durability

In addition to reinforcing the edge areas, the durability of the security paper can be increased further by performing the following measures singly or in combination:

i) In the production of security paper, in particular bank note paper, the basic substrate used is customarily a paper with a weight of 90 to 95 grams per square meter. In the inventive security papers a thicker paper can instead be used with e.g. 100 grams per square meter. The higher weight per unit area and resulting higher thickness of the paper already causes a reinforcement of the security paper to be obtained, without any substantial impairment of the properties desired in particular for bank notes.

ii) The use of double-sided steel printing on the security paper increases the compression and thus stability of the paper substrate.

iii) The security paper, but above all the printed security paper, can additionally be lacquered to protect the print and the paper from soiling. The lacquer layer is preferably coordinated in its composition with the inventive lacquer layer, if present, to permit a good bond of the two layers. The bond can possibly be improved further by an additional crosslinking step. This can be effected by the action of heat or irradiation (e.g. with UV radiation).

Variants A) to D) can be used singly but also in any desired combination for increasing durability, in particular initial tear strength.

The inventive security paper can for example also be used advantageously for producing ID cards and passports. Since it has increased tear resistance and dirt resistance, the usual lamination with plastic foils might be omitted. This eliminates an elaborate additional step, thereby obtaining a considerable time and cost saving.

Due to the increased initial tear strength along with high tear propagation resistance of paper, the present invention provides an extremely durable security paper. Looking at the European and North American regions and disregarding tropical zones, the period of circulation of an inventive bank note may be more than three times the period of circulation of a conventional bank note.

Hereinafter some examples of the inventive security paper will be explained:

Example 1

Foil-Reinforced Edge Area (Net-Shaped Structure)

A square grid cloth of 5 micron thick polypropylene fibers with a mesh width of 0.1 millimeters is incorporated into the paper material in the form of bands spaced 10 centimeters apart and with all-over cover during the dipping process in the production of bank note paper. The polypropylene fibers are colored in a color close to the paper.

Example 2

Foil-Reinforced Edge Area (Strip-Shaped Plastic Foil)

3 millimeter wide and 15 micron thick transparent polyester strips are supplied to the drum of a cylinder paper machine alternately spaced 6 and 1 centimeters so that the foil strips are embedded into the paper during sheet formation. Subsequent to completion of the paper web, the latter is cut in the middle between the 1 centimeter spaced foil strips and at right angles thereto at a spacing of 12 centimeters. The result is a 12 centimeter by 7 centimeter document of value with two foil reinforcements extending parallel to the longitudinal edges and set in 0.5 centimeters therefrom.

Example 3

Synthetic Fiber Reinforced Edge Area

Special fibers, namely polyamide fibers, and cotton fibers are processed in a Willcox plant so as to produce a paper web having strips with a width of 2 centimeters and extending at a spacing of 6 centimeters, and the fiber composition of said strips is not 100% cotton fibers but 50% cotton fibers and 50% synthetic fibers. In the remaining area of the paper web there are 100% cotton fibers. The paper web is optionally printed after production and cut so as to yield bank notes with a length of 16 centimeters and a width of 8 centimeters, the polymer fiber reinforcement extending along the longitudinal edges of the bank note and flush therewith.

BRIEF DESCRIPTION OF THE DRAWINGS

Further advantages and embodiments will be explained in more detail with reference to the figures. It is pointed out that the figures show the layer structure of the inventive security paper or document of value only schematically.

DETAILED DESCRIPTION OF THE INVENTION

Figure 1:
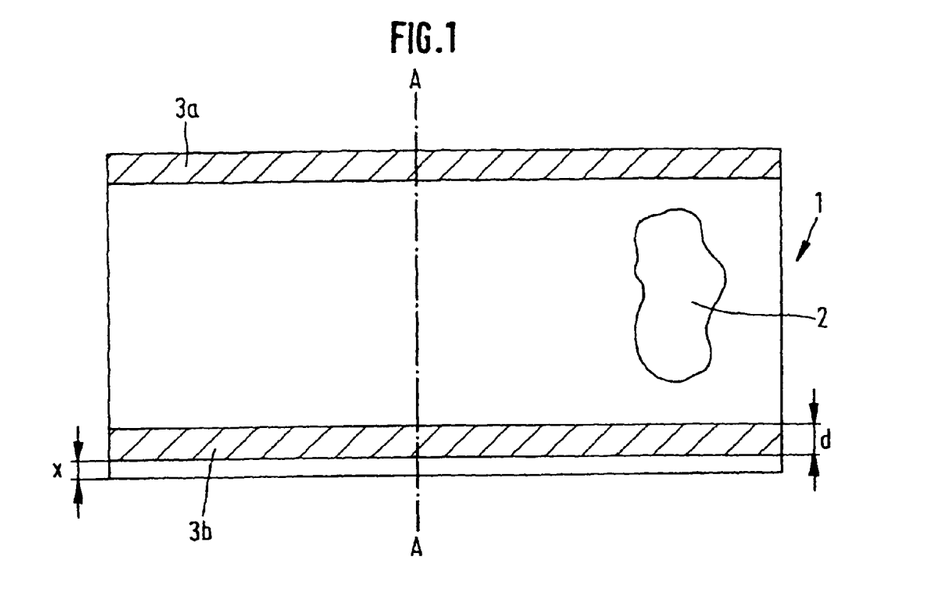
FIG. 1 shows an inventive document of value in a front view.

FIG. 1 shows inventive document of value 1. Such a document of value is usually made of cotton fibers or other fibers from annuals. For some applications, however, it can be expedient to replace part of said natural fibers by polymer fibers, in particular polyamide fibers. During production of security paper 7 inventive reinforcements 3a, 3b shown in FIG. 1 are already embedded into the paper. If desired, individual security elements, for example portrait watermark 2, are additionally incorporated during production. Reinforcements 3a, 3b can be any of variants A) to C). In the present case, document of value 1 was provided with flush reinforcement 3a at the top edge and with set in reinforcement 3b at the bottom edge. However, the reinforcements are preferably formed symmetrically, i.e. either both reinforcements set in or aligned flush with the edge of the document of value. Width d of the reinforcements depends on, among other things, the material to be processed for the reinforcements and the desired purpose. The more tear-resistant the material for the reinforcements is, the narrower the reinforcement can be. With use of plastic strips, in particular polyester, width d ranges preferably from 1 to 10 millimeters, especially preferably from 2 to 3 millimeters. Distance x of the reinforcement from the edge of the document of value likewise depends on the materials used. Preferably, "x" ranges between 0 and 5 millimeters, whereby values of 0 and 2 millimeters are especially preferred. The values for "d" and "x" are in any case to be selected so as to achieve the inventive purpose, namely reinforcement of the edge areas. These values can be determined by the expert by suitable tests.

Figure 2:
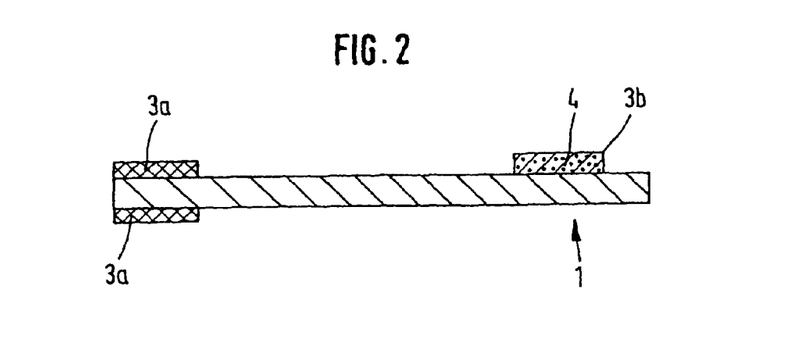
FIGS. 2 and 3 show a section along A-A through the inventive document of value according to FIG. 1, FIGS. 4 and 5 show further embodiments of inventive documents of value in a front view.

FIG. 2 shows a section through inventive document of value 1 along dash-dotted line A-A in FIG. 1. The embodiments of inventive reinforcements 3a, 3b shown in FIG. 2 are lacquer reinforcements that have been knife-coated or printed all over in two strip-shaped areas of document of value 1. Reinforcement 3a has been applied to security paper 7 on both sides. The lacquer of reinforcement 3b is additionally doped with additive 4 which is visually and/or machine testable. The additive can be for example a luminescent substance transparent under normal lighting that emits in the visible spectral region when irradiated with UV light and thus shows an intensive color tone. In this case the luminescence is only visible under UV lighting. However, a plurality of additives can also be provided that are individually detectable. The mixture ratio of the additives can serve e.g. to produce a coding.

Figure 3:
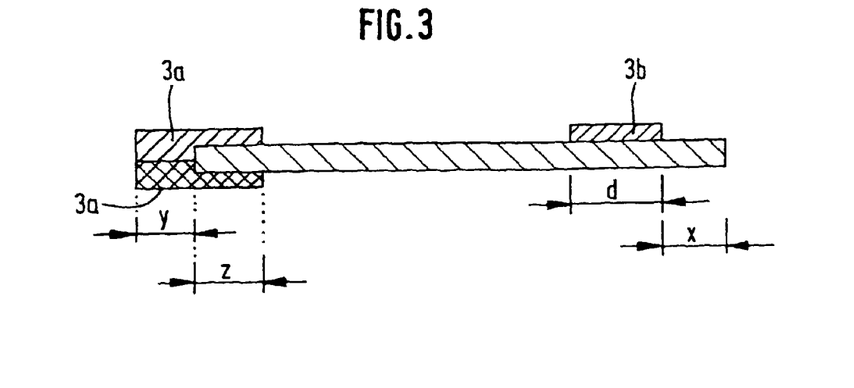

FIG. 3 shows a section through document of value 1 comparable to that in FIG. 1, along dash-dotted line A-A. The embodiments of inventive reinforcements 3a, 3b shown in FIG. 3 are foil reinforcements that are applied, e.g. glued, in two strip-shaped areas of document of value 1. Reinforcement 3a has been applied to security paper 7 on both sides in such a way that foil material protrudes over the edge of the finished document of value. Width y of the protruding foil and width z of the overlap depend on the reinforcement materials used. The values for "y" are advantageously within the range of about 0.1 to 10 millimeters, the value for "z" should be at least about 1 millimeter, preferably 5 millimeters. The foil material in FIG. 3 is a plastic foil of polyester. Width d of reinforcement 3a is 7 millimeters with "z" equal to 5 millimeters and "y" equal to 2 millimeters. Width d of reinforcement 3b is 3 millimeters with "x" equal to 2 millimeters. The foil material can additionally be doped with additive 4 which is visually and/or machine testable. For example, the foil can also be equipped with additional optical security elements such as holograms, Kinegrams® or other diffraction structures, but also printing inks containing interference layer or liquid crystal pigments or other special-effect pigments, such as lustrous metallic effect coloring pigments, iridescent pigments, etc.

Figure 4:
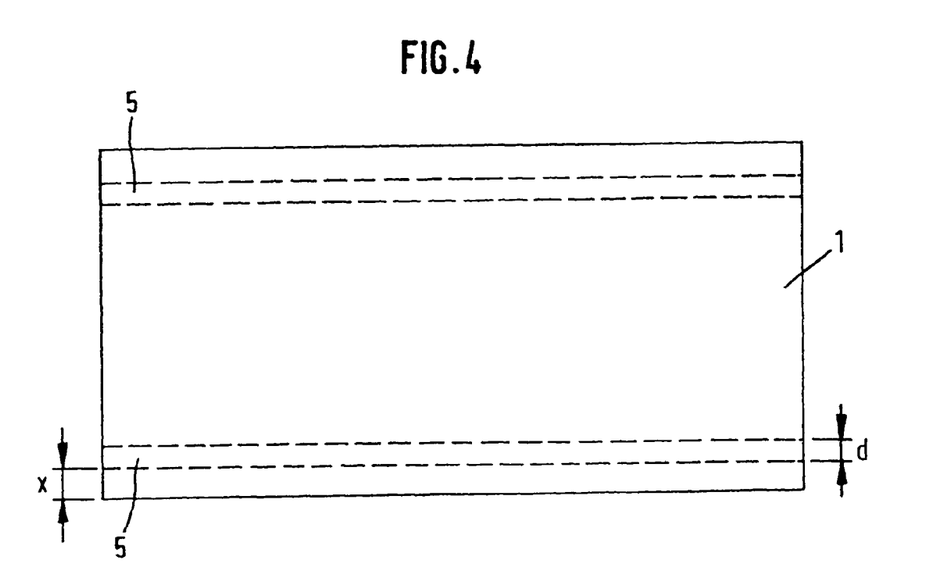

FIG. 4 shows inventive document of value 1 into which strip-shaped foil material 5 was already incorporated during papermaking. Foil material 5 is quasi embedded into the paper, so that it is embedded completely into the paper pulp in the areas marked by dash lines. This strip can be provided with any machine-readable security features, such as an electroconductive, metallic layer or the like. However, it is preferably a polyester band which is of transparent design or given the color of security paper 7 or document of value 1 so that it is preferably hardly or not at all visible. The foil strips of this embodiment are about 2 to 3 millimeters wide (d) and set in about 2 to 3 millimeters (x) from the edge of the document of value. The thickness of the foil ranges from about 10 to 50 microns, and is preferably about 15 microns.

Figure 5:
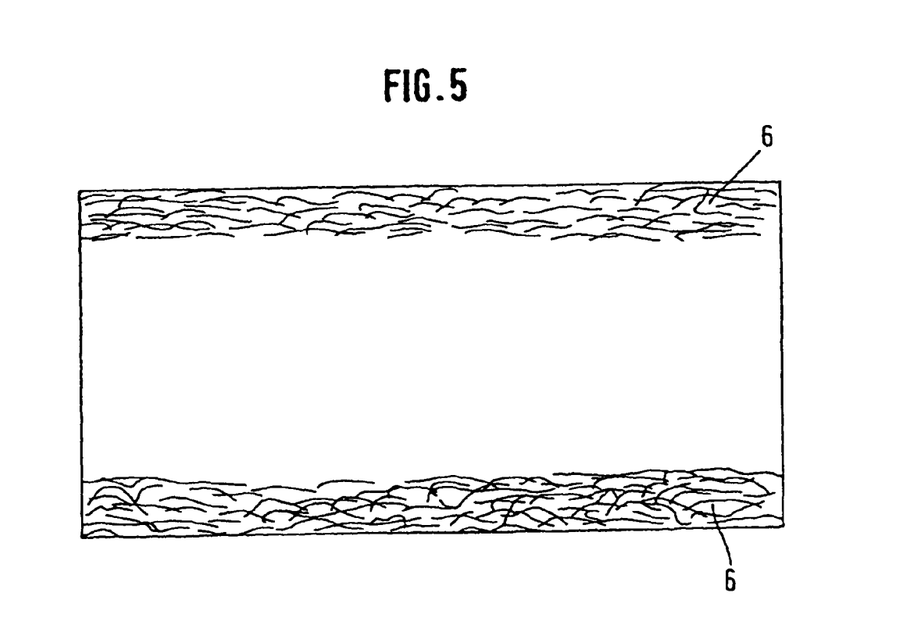

FIG. 5 shows inventive document of value 1 into which polymer fibers 6 were already incorporated during papermaking so as to be flush with the edge of the document of value. The polymer fibers are polypropylene fibers. Width d of The reinforcement by polymer fibers advantageously has a value between 0.5 and 10 millimeters.

Figure 6A:
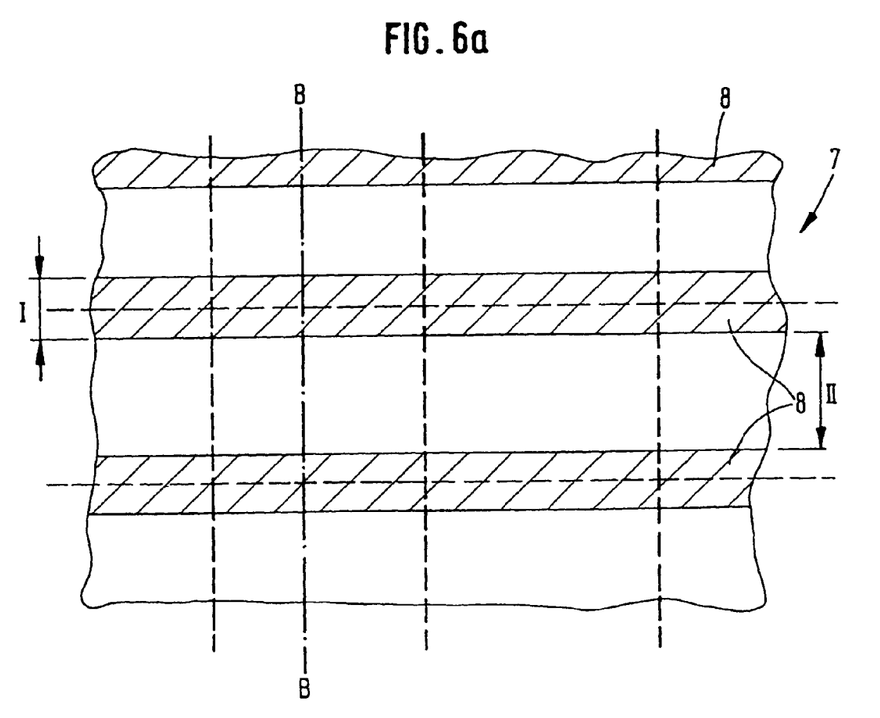
FIG. 6a shows a front view of a detail of an inventive security paper.

FIG. 6a shows a detail of inventive security paper web 7 as used for example for producing bank notes. Strip-shaped reinforcements 8 were applied to paper web 7 on the front side of the paper web after papermaking. Reinforcements 8 can be for example laminated-on plastic foils, a printed-on lacquer layer or embedded special fibers. The width of the reinforcements on the paper web must be twice as great, i.e. 2×d, as width d desired in the finally cut note. Number I designates the area where reinforcements overlap with paper, and number II designates the area where paper is present without reinforcement. Cutting paper web 7 along the dashed lines yields e.g. bank notes having reinforcements running parallel along the longitudinal edges and flush therewith.

Figure 6B:
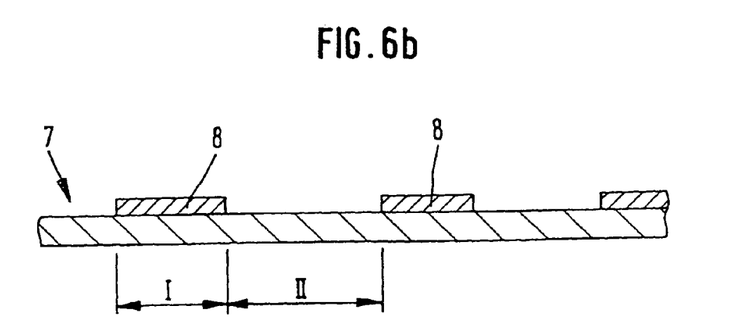
FIG. 6b shows a section along B-B through the inventive security paper according to FIG. 6a, FIG. 7a shows a front view of a detail of an inventive security paper.

FIG. 6b shows a section through inventive security paper web 7 along dash-dotted line B-B in FIG. 6a.

Figure 7A:
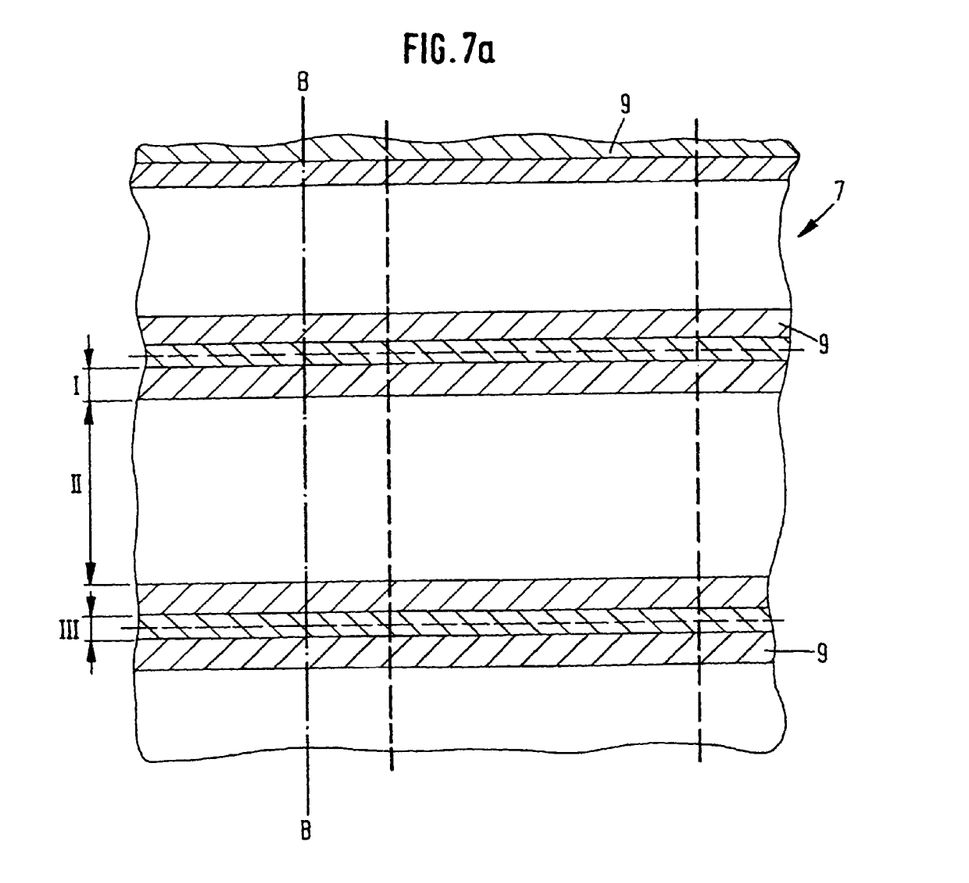

FIG. 7a shows a detail of inventive security paper web 7 as used for example for producing bank notes. Strip-shaped reinforcements 9 were embedded into paper web 7 during papermaking. Reinforcements 9 can be for example strip-shaped plastic foils with e.g. perforated edges or net-shaped structures. The width of the reinforcements on the paper web must be twice as great, i.e. 2×d, as width d desired in the finally cut note. Number I designates the area where reinforcements are embedded into paper, number II designates the area where paper is present without reinforcement, and number III designates the area where only reinforcement is present. Cutting paper web 7 along the dashed lines yields e.g. bank notes having reinforcements running parallel along the long sides and protruding over the longitudinal edges of the bank note.

Figure 7B:
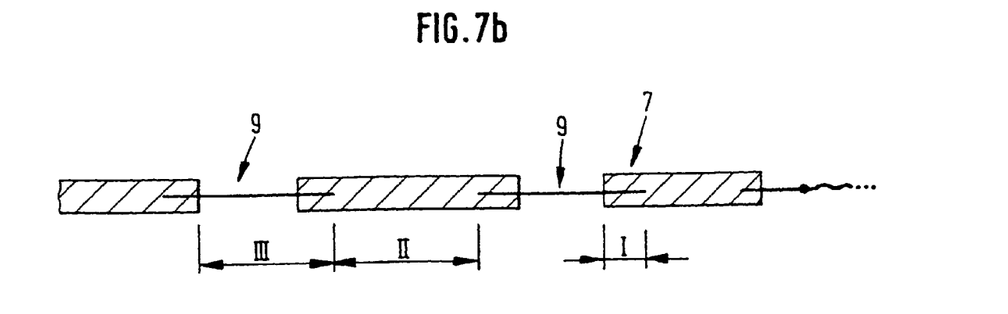
FIG. 7b shows a section along B-B through the inventive security paper according to FIG. 7a, FIG. 8a shows a front view of a detail of an inventive security paper.

FIG. 7b shows a section through inventive security paper web 7 along dash-dotted line B-B in FIG. 7a.

Figure 8A:
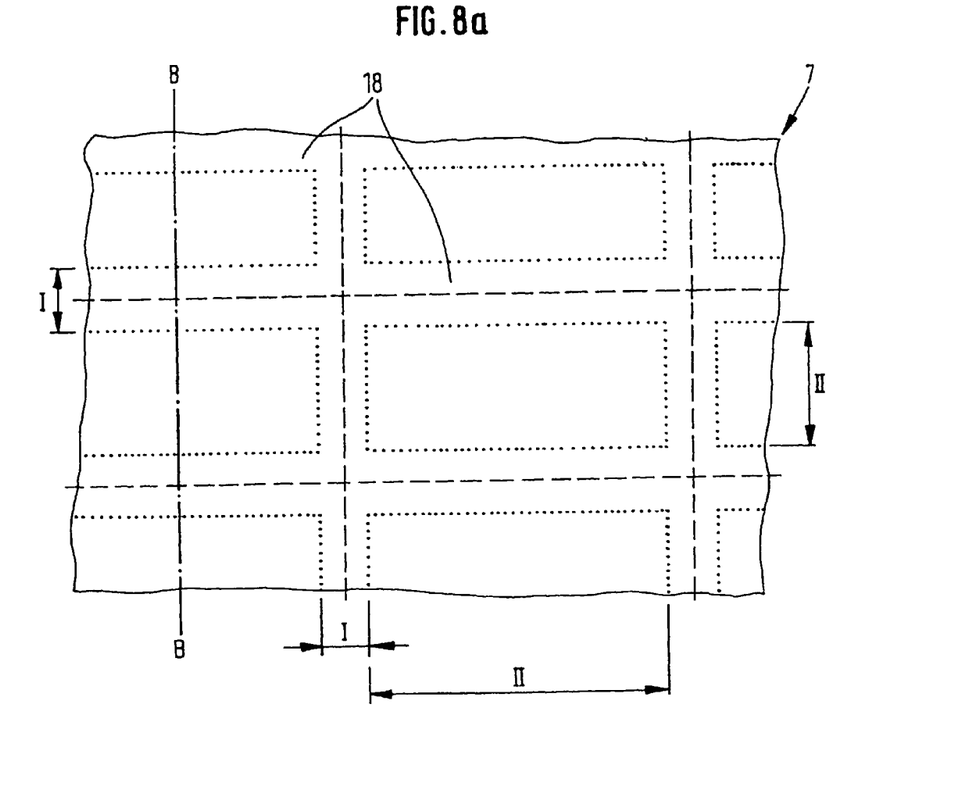

FIG. 8a shows a detail of inventive security paper web 7 as used for example for producing bank notes. Grid-shaped reinforcement 18 was already embedded into paper web 7 during papermaking, so that it is embedded completely into the paper pulp in the areas shown by dotted lines. Grid-shaped reinforcement 18 can consist e.g. of above-described foil material, preferably of plastic foils or netlike structures. The grid-shaped reinforcement can be provided with any machine-readable security features, such as an electroconductive, metallic layer or the like. The width of the reinforcements on the paper web must be twice as great, i.e. 2×d, as width d desired in the finally cut note. Number I designates the area where reinforcements are embedded into paper, number II designates the area where paper is present without reinforcement. Cutting paper web 7 along the dashed lines yields e.g. bank notes having reinforcements running along all sides, i.e. the longitudinal and transverse sides, and flush therewith.

Figure 8B:
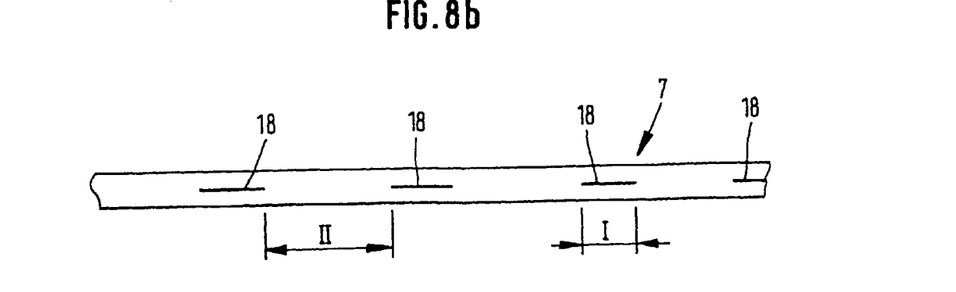
FIG. 8b shows a section along B-B through the inventive security paper according to FIG. 8a, FIG. 9 shows the schematic representation of a two cylinder paper machine for producing a security paper.

FIG. 8b shows a section through inventive security paper web 7 along dash-dotted line B-B in FIG. 8a.

Figure 9:
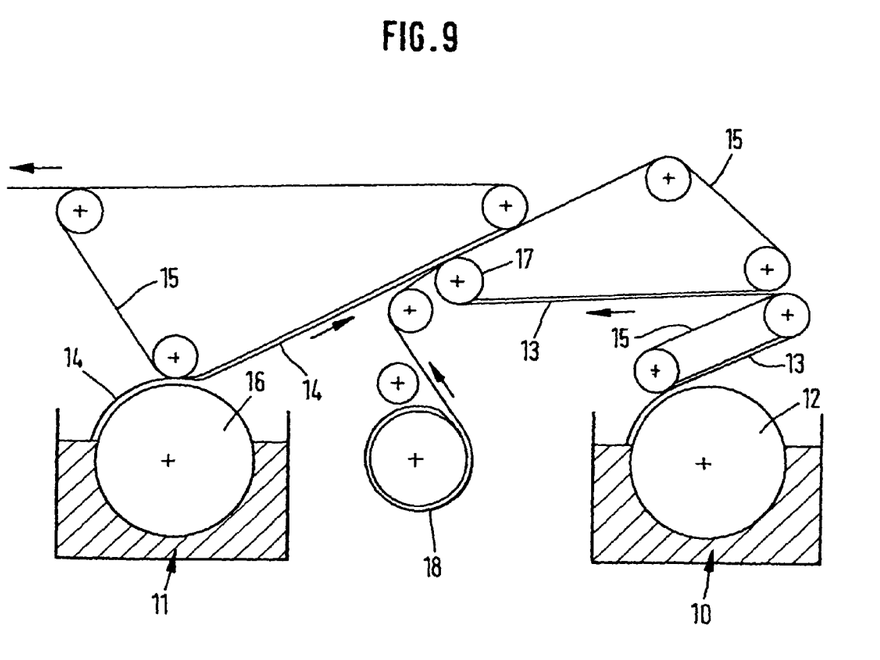

FIG. 9 shows the schematic representation of a two cylinder paper machine as used for producing the inventive security paper. The plant comprises two cylinder paper machines 10 and 11. Paper web 13 is formed in paper machine 10 on cylinder 12. Paper machine 11 is used to make second paper web 14 simultaneously with production of paper web 13. Paper webs 13 and 14 are removed from cylinders 12, 16 using so-called "pickup felts" 15, interconnected in the area of pressure roll 17 and supplied together to the further processing stations (calender, paper sizing, etc.) of the manufacturing plant. To produce the security paper shown in FIGS. 8*a* and 8*b*, grid-shaped foil material 18 is additionally supplied between paper webs 13 and 14 in the area of pressure roll 17, so that grid-shaped foil material 18 is embedded into the finished security paper.

The invention claimed is:

1. A document of value in the form of a bank note, check, passport or ID card, comprising:
   a security paper having at least one edge area including a two-dimensionally extended margin area adjoining an edge of the document of value; and
   a tear resistance increasing reinforcement to increase the document's fitness for circulation in its common trade without changing the document's other typical properties,
   wherein the reinforcement is provided only in the two-dimensionally extended margin area.

2. A document of value according to claim 1, characterized in that the reinforcement is applied to at least one of the front or back of the security paper.

3. A document of value according to claim 1, characterized in that the reinforcement is at least partly incorporated into the volume of the security paper.

4. A document of value according to claim 1, characterized in that the reinforcement comprises special fibers.

5. A document of value according to claim 4, characterized in that the special fibers comprise at least one of synthetic fibers, long fibers, wet beaten fibers or after-treated fibers.

6. A document of value according to claim 1, characterized in that the reinforcement comprises a lacquer.

7. A document of value according to claim 6, characterized in that the lacquer is printed on by screen printing.

8. A document of value according to claim 1, characterized in that the reinforcement comprises a foil material.

9. A document of value according to claim 8, characterized in that the foil material comprises polyester, metal, polyester-metal laminate or another tear-resistant material.

10. A document of value according to claim 8, characterized in that the foil material comprises a 15 micron thick polyester foil.

11. A document of value according to claim 8, characterized in that the foil material has a width of from 1 to 4 millimeters, preferably 2 or 3 millimeters.

12. A document of value according to claim 8, characterized in that the reinforcement is a net-shaped structure.

13. A document of value according to claim 12, characterized in that the net-shaped structure comprises natural, synthetic and/or glass fibers.

14. A document of value according to claim 1, characterized in that the reinforcement is grid-shaped or strip-shaped and extends parallel to the edge of the document of value.

15. A document of value according to claim 1, characterized in that the reinforcement protrudes over the edge of the security papers.

16. A document of value according to claim 1, characterized in that the reinforcement has luminescent, magnetic, electroconductive, diffractive, light-interfering or light-polarizing properties.

17. A document of value according to claim 1, characterized in that the security paper consists of fibers from annuals, in particular cotton fibers.

18. A document of value according to claim 1, characterized in that the security paper consists at least partly of polymer fibers, preferably polyamide fibers.

19. A document of value according to claim 1, characterized in that the security paper has a weight of 100 grams per square meter.

20. A document of value according to claim 1, characterized in that the document of value is equipped with double-sided intaglio printing.

21. A document of value according to claim 1, characterized in that the document of value has a print covered by a coating, e.g. a lacquer layer.

22. A document of value according to claim 1, characterized in that the document of value is a bank note.

23. A document of value according to claim 1, wherein said reinforcement is flush with the edge of the security paper.

24. A document of value according to claim 1, wherein said reinforcement is set in from the edge of the security paper.

25. A method for producing a document of value comprising the steps of:
   providing a security paper which is provided at least in a certain area with a reinforcement; and
   cutting the security paper to size such that said reinforcement is present only in a two-dimensionally extended margin area adjoining an edge area of the resulting document of value.

26. A method of claim 25, wherein the document of value is a bank note, check, passport or ID card.

* * * * *